Feb. 23, 1926.
H. T. HERR
DIESEL ENGINE
Filed Feb. 28, 1921
1,573,831
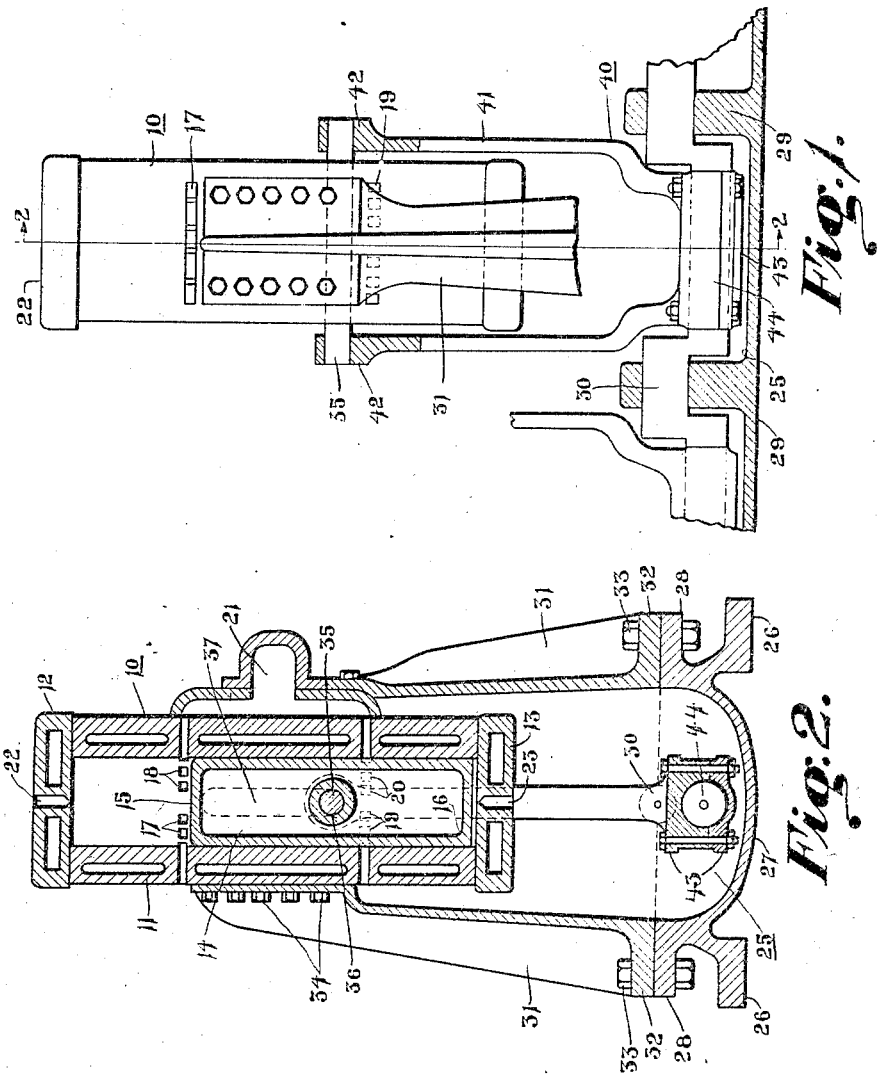
H.T.Herr
INVENTOR
D.C.Davis
ATTORNEY Patented Feb. 23, 1926.

1,573,831

UNITED STATES PATENT OFFICE.

HERBERT T. HERR, OF MERION, PENNSYLVANIA, ASSIGNOR TO WESTINGHOUSE ELECTRIC AND MANUFACTURING COMPANY, A CORPORATION OF PENNSYLVANIA.

DIESEL ENGINE.

Application filed February 28, 1921. Serial No. 448,374.

To all whom it may concern:

Be it known that I, HERBERT T. HERR, a citizen of the United States, and a resident of Merion, in the county of Montgomery and State of Pennsylvania, have invented a new and useful Improvement in Diesel Engines, of which the following is a specification.

My invention relates to internal combustion engines and has particular reference to double-acting internal combustion engines of the Diesel type in which two power strokes are provided with each revolution of the engine.

An object of my invention is to provide an internal combustion engine of the character designated in which a single piston having two working faces is arranged to control two sets of inlet and exhaust ports, one set of ports being provided for the upper end of the cylinder and another set of ports for the lower end of the cylinder.

A further object of my invention is to provide a novel supporting means for the engine cylinder which will permit free expansion of the working chambers.

A further object of my invention is to provide in a double-acting internal combustion engine novel and efficient means for transmitting power from the engine piston to the crank shaft.

These and other objects, which will be made apparent throughout the description of my invention, are attained by means of apparatus described herein and illustrated in the accompanying drawing in which—

Fig. 1 is a side elevation of an internal combustion engine embodying my invention, and Fig. 2 is a longitudinal sectional view thereof taken on the line 2—2 of Fig. 1.

It has been long recognized that an internal combustion engine in which an impulse is given to the piston at each stroke thereof, instead of an impulse for each two or four strokes as is now the common practice, provides a more uniform transmission of power to the driven shaft and greatly reduces the weight of the engine per horse-power. I am enabled to attain this desired result by the employment of the Diesel principle in connection with a novel cylinder arrangement in which a combustion chamber is provided in each end of the cylinder, each chamber having inlet and exhaust ports which are opened and closed by movements of a single piston and in which a supporting frame for the cylinder insures uniform operating condition in each end of the cylinder under all conditions of operation. A novel and unique means of transmitting power from the piston to the crank shaft obviates the necessity of passing a connecting rod through the lower head of the cylinder. These several constructions cooperate to produce a double-acting internal combustion engine of the Diesel type which operates with a high degree of efficiency.

Referring to the drawing, 10 designates an engine unit which is composed of a cylinderical portion 11 and cylinder heads 12 and 13 which form closures for the top and bottom, respectively, of the cylinder 11. A piston 14 is arranged to reciprocate within the cylinder 11 and is provided with closed ends 15 and 16 which define, in the reciprocation of the piston, a combustion chamber alternately in each end of the cylinder 11. Arranged in the lower portion of the upper combustion chamber, so as to be uncovered by the last portion of the downward stroke of the piston, are air inlet ports 17 and exhaust ports 18. Similar air inlet ports 19 and exhaust ports 20 are provided in the upper portion of the lower combustion chamber and are similarly arranged to be uncovered by the piston during the last portion of its upward stroke. The exhaust ports 18 and 20 may preferably lead to an exhaust manifold 21. Fuel-injection ports 22, 23 are situated in the upper and lower heads of the engine cylinder, in which fuel injection valves of any well known type may be installed.

A crank case base member 25 is provided and may be of any suitable construction. As illustrated, it is composed of foot members 26 and a concave crank containing portion 27 having upper flanged portions 28. Shaft bearings 29 in which the shaft 30 is journaled may be constructed integral with the base member 25, or may be detachably secured thereto. Vertical cylinder-supporting members 31 having flanges 32 are secured to the flanges 28 of the base member by means of the bolts 33. The upper portions of the members 31 are secured to the cylinder at its central portion by means of bolts 34 or other securing means.

A wrist pin 35 passes centrally through the piston 14 and is preferably secured thereto within the boss 36. The wrist pin 35 extends at each end beyond the piston and projects through the cylinder, longitudinal slots 37 being provided on the opposite sides of the piston, equal in length to the stroke of the piston, in which the wrist pin reciprocates. A yoke-shaped connecting member 40 is provided with two arms 41 which extend upwardly on opposite sides of the cylinder and are trunnioned at their upper portions 42 on the projecting ends of the wrist pin 35. The lower portion of the yoke-connecting member 40 is provided with a relatively long bearing portion 43 which is adapted to operatively engage a correspondingly long pitman portion 44 of the engine shaft 30.

Having described the arrangement of a construction embodying my invention, the operation thereof is as follows: With the piston 14 in the lower position, shown in Fig. 2, exhaust gases are discharged through the ports 18 and air is admitted to the port 17 to scavenge and fill the combustion chamber with pure air in a manner common in two-cycle Diesel engine practice. During the upward stroke of the piston, the air above the piston attains a high pressure and temperature. When the piston has reached its highest point, fuel, under pressure, is admitted through the port 22 and ignition thereof takes place due to the high temperature of the air within the combustion chamber. The piston is thereupon forced downward to the lowermost position at which the exhaust gases escape and air is admitted to scavenge and refill the cylinder for the repetition of the cycle. The operations within the combustion chamber at the lower portion of the cylinder are similar to those described above in relation to the upper combustion chamber. It is obvious that when the contents of the upper combustion chamber are undergoing an expansion, the air within the lower combustion chamber is being compressed, and vice versa. An impulse is thus given to the piston on each stroke and the power transmitted through the connecting member 41 to the engine shaft 30 on each throw of the crank.

The supporting members 31 are secured to the central portion of the cylinder 11 and the wrist pin 35 to the central portion of the piston 14, an arrangement which serves to maintain the inlet and exhaust ports of both the upper and lower combustion chambers in proper relation to the piston movements. This construction is particularly advantageous since under the high temperatures at which a Diesel engine operates, a certain amount of longitudinal expansion of the cylinder and piston of necessity results. Were the cylinder or the piston supported at either end, a greater or less relative longitudinal displacement of the ports would be occasioned by the expansion of these members. Moreover, the clearance spaces between the piston and the cylinder heads, when these members are in their closest proximity, are very limited. The central supports of the cylinder and piston permit both ends of the cylinder and piston to expand equally so as to provide equal clearances at either end. This serves to maintain uniform degrees of compression and consequently uniform power development within each of the combustion chambers under all engine temperatures.

The transmission mechanism is so arranged as to interfere in no way with the combustion chambers and at the same time provides a simple and direct connection between the reciprocating piston and the engine shaft. The elongated bearing surfaces between the yoke-connecting member and the crank of the engine shaft gives to the connecting member a greater stability and prevents uneven stresses in the members connecting the projecting ends of the wrist pin with the crank shaft.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claim.

What I claim is:

The combination with a double-acting internal combustion engine having a vertically disposed cylinder closed at both ends and a piston arranged to reciprocate therein and providing combustion chambers at each end of the cylinder, of piston-controlled inlet and exhaust ports in the cylinder at the inner portions of each combustion chamber, and a supporting frame secured to the cylinder centrally between the two ports whereby the periods of opening and closing the ports will be uniformly timed under all conditions of expansion of the cylinder.

In testimony whereof, I have hereunto subscribed my name this 24th day of February, 1921.

HERBERT T. HERR.